United States Patent [19]
Ramun et al.

[11] 4,188,721
[45] Feb. 19, 1980

[54] ATTACHMENT FOR A BACK HOE

[76] Inventors: Michael Ramun; John R. Ramun, both of 2100 Poland Ave., Youngstown, Ohio 44502

[21] Appl. No.: 957,406

[22] Filed: Nov. 2, 1978

[51] Int. Cl.² ............................................. E02F 3/28
[52] U.S. Cl. ...................................... 30/134; 30/231; 144/34 E; 414/740
[58] Field of Search ................ 30/134, 231; 144/34 E; 414/740

[56] References Cited
U.S. PATENT DOCUMENTS

| | | | |
|---|---|---|---|
| 2,332,561 | 10/1943 | Drott | 30/231 X |
| 3,275,172 | 9/1966 | Smith | 414/740 |
| 3,550,655 | 12/1970 | Murphy | 144/34 E |
| 3,972,097 | 8/1976 | Schakat | 414/740 |
| 4,104,792 | 8/1978 | LaBounty | 30/134 |

*Primary Examiner*—Jimmy C. Peters
*Attorney, Agent, or Firm*—Webster B. Harpman

[57] ABSTRACT

A back hoe attachment for cutting and moving cables or the like pivotally positions a cutting blade and hook on the end of a back hoe boom for actuation by a piston and cylinder of the back hoe. A fixed blade is secured to the boom forming a shear point between the movable cutting blade and the fixed blade.

6 Claims, 4 Drawing Figures

ATTACHMENT FOR A BACK HOE

BACKGROUND OF THE INVENTION

1) Field of the Invention

This invention relates to attachments for back hoes as are commonly used in industry.

(2) Description of the Prior Art

Prior Devices of this type have utilized hydraulically operated attachments for back hoes. See for example U.S. Pat. Nos. 3,275,172, 3,972,097 and 3,568,742.

In U.S. Pat. No. 3,275,172 a back hoe attachment is dislosed having a movable jaw and a stationary abutment plate wherein an object is grasped between the jaw and the stationary plate.

Applicant's device discloses a shearing or cutting means for cables or the like wherein a movable blade is guided past and adjacent to a fixed blade for a shearing action of the material therebetween.

In U.S. Pat. No. 3,972,097 an excavator attachment is disclosed having a hydraulically controlled gripping and shearing arm wherein the blade portion is moved against a stationary surface.

Applicant's invention discloses a pair of blades wherein the movable blade is guided adjacent an offset fixed blade creating a shearing action between the blades.

U.S. Pat. No. 3,568,742 shows a tree cutting device wherein a pivotally mounted blade powered by a hydraulic cylinder and piston, moves against and abuts an anvil cutting the tree between them.

Applicant's device discloses a shearing device utilizing a movable and fixed blade offset in such a manner as to provide for the shearing or cutting of cable or the like material between the two blade surfaces.

SUMMARY OF THE INVENTION

A back hoe attachment comprises a movable cutting blade and hook positioned on the end of a back hoe boom in place of the normal bucket. A pair of pivotal arms are secured to the cutting blade and to a hydraulic piston and cylinder of the back hoe. A blade guide is positioned on the back hoe boom adjacent the blade and forms a guide channel for the blade as it is moved up through the guides by the hydraulic piston and cylinder.

DESCRIPTION OF THE PREFERRED EMBODIMENT

Figure 1:
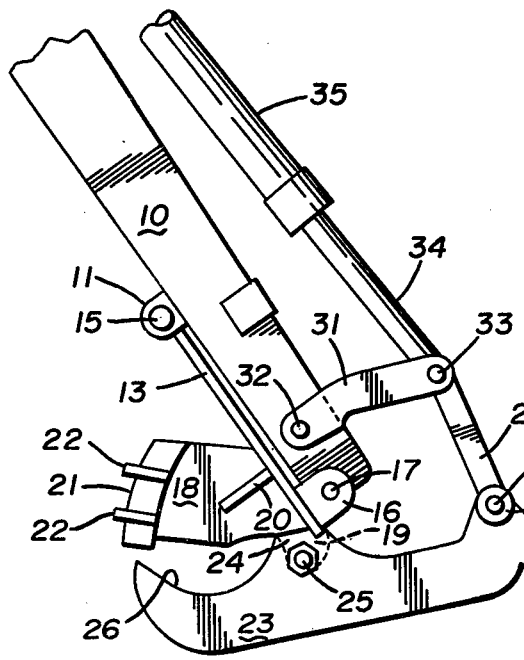
FIG. 1 is a side elevation of the back hoe attachment with the blade portion pivotally closed.
Figure 2:
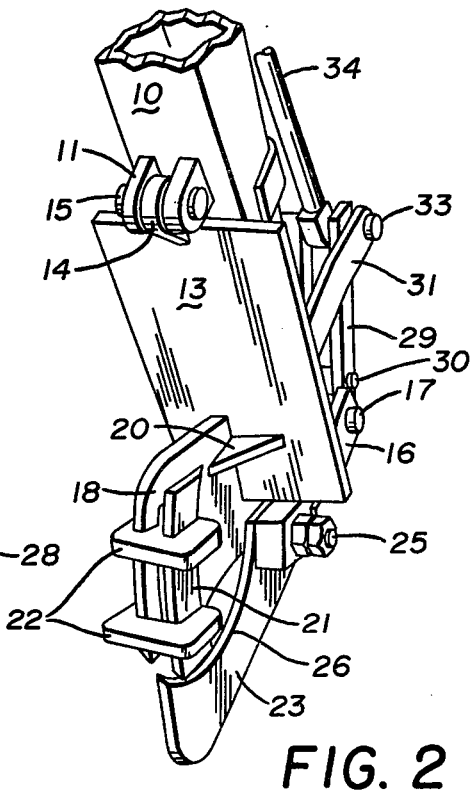
FIG. 2 is a front perspective view of the back hoe attachment.
Figure 3:
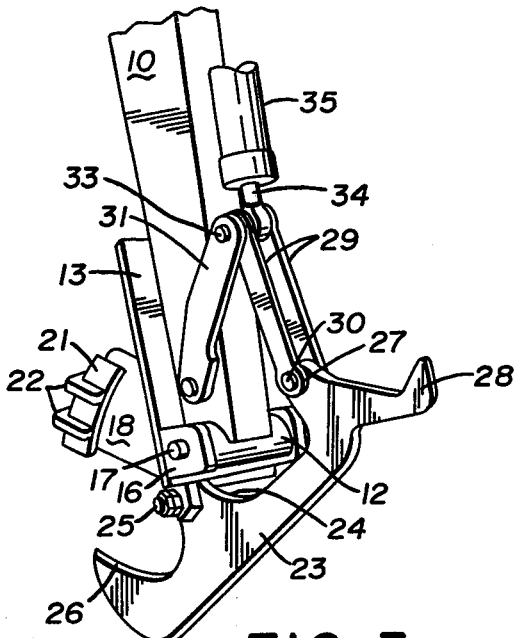
FIG. 3 is a back perspective view of the back hoe attachment.

Back hoes such as used in industry are powered machines having an extensible boom with hydraulic controlled cylinders mounted thereon. A bucket is normally attached to the end of the boom and is moved by a hydraulic piston and cylinder.

Applicant's device is an attachment for a back hoe that is used in place of the bucket for cutting and pulling of cables or the like normally found in structures being dismantled. As will be seen in the drawings, a back hoe boom 10 has a pair of apertured support lugs 11 thereon and an apertured cylindrical body 12 positioned transversely on the end thereof. An adaptor plate 13 has an apertured support lug 14 at one end which is removably secured between said lugs 11 by a fastener 15. A pair of apertured lugs 16 extend from the other end of said adaptor plate 13 and engage a fastener 17 in the cylindrical body member 12. The adaptor plate 13 is thus removably affixed to the boom 10.

A fixed blade 18 is placed adjacent the apertured plate 13. A pair of braces 20 are secured to the adaptor plate 13 and the opposite sides of the fixed blade 18. A guide bar 21 is held in spaced relation at the outermost end of said fixed blade 18 by a pair of spacing elements 22. A vertically standing movable blade 23 having an apertured upwardly extending portion 24 is pivotally secured to the apertured depending portion 19 of the fixed blade 18 by a fastener 25. The movable blade 23 is thus arranged in shearing relation to the fixed blade 18. The upper edge of a portion of the movable blade 23 is formed in a concave shape and beveled as at 26. An oppositely disposed portion of said movable blade 23 extends outwardly and upwardly and is apertured at 27. A hook 28 extends from the end of the oppositely disposed portion of said blade 23. A pair of links 29 are pivotally attached to the oppositely disposed portion of the movable blade 23 by a fastener 30 in the aperture 27. A pair of secondary links 31 are pivotally attached at one of their ends to the boom 10 by a fastener 32 and their other ends are pivotally attached to the links 29 by a fastener 33.

A piston rod 34 of a piston and cylinder assembly 35 is also engaged on the fastener 33 and the piston and cylinder assembly 35 is pivotally attached to the boom 10.

Figure 4:
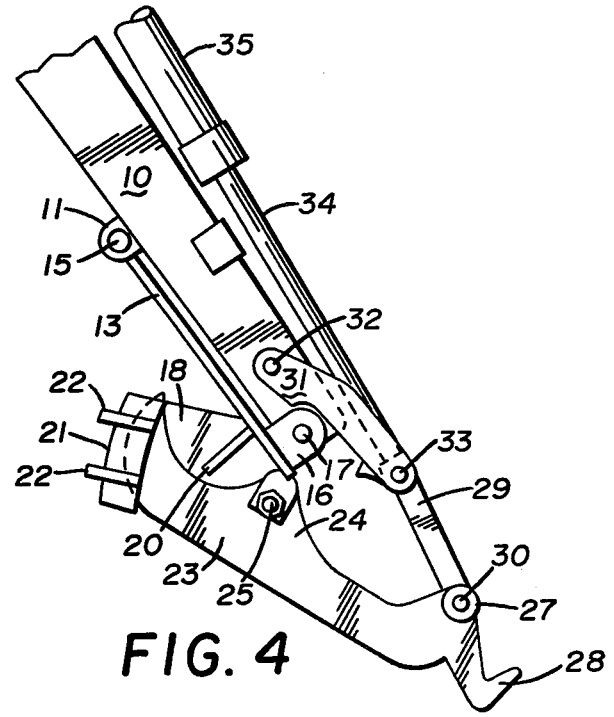
FIG. 4 is a side elevation with the cutting blade in a fully closed position.

In operation the attachment for a back hoe may be used to reach out to a group of cables, pipes or the like, and engage them with the hook 28 in its extended position as seen in FIG. 4 of the drawings, and pull the cables or pipes, etc. from their remote location to a position near the back hoe. In such location the cables, pipes and the like may then be easily cut by the device into smaller sections that may be conveniently handled.

It will thus be seen that a new and novel back hoe attachment has been disclosed utilizing a pair of offset blades in combination to perform a shearing action on cables or the like.

Although but one embodiment of the present invention has been illustrated and described, it will be apparent to those skilled in the art that various changes and modifications may be made therein without departing from the spirit of the invention and having thus described our invention what we claim is:

1. A cutting and manipulating attachment for a back hoe the bucket of which has been removed and having a boom with a controlled piston and cylinder connected thereto, the attachment comprising an adaptor plate secured to said boom, a fixed blade secured at one of its ends to said plate, guide means on the other end of said fixed blade spaced with respect thereto, a movable blade pivotally secured between its ends to said fixed blade with one portion in shearing relation to said fixed blade, a hook formed on the end of the other portion of said movable blade, means adjacent said hook linking said movable blade to the controlled piston and cylinder on said boom whereby said movable blade and hook are movable by said piston and cylinder in a cutting and pulling action.

2. The cutting and manipulating attachment of claim 1 wherein said guide means comprises a pair of spacing elements on said fixed blade and a guide bar attached thereto and arranged in parallel relation to said fixed blade.

3. The cutting and manipulating attachment of claim 1 wherein said means for linking comprises pairs of first and secondary links pivotally attached at one of their ends to said controlled piston and cylinder, said first pair of links being pivotally attached at their other end to said movable blade and said secondary pair of links being attached at their other ends to said boom.

4. The cutting and manipulating attachment of claim 1 and wherein said adaptor plate is removably secured to said boom.

5. The cutting and manipulating attachment of claim 1 wherein said fixed blade is arranged in vertically standing relation to said boom and said movable blade is arranged in vertically standing and shearing relation to said fixed blade.

6. The cutting and manipulating attachment of claim 1 and wherein said movable blade is an elongated member positioned on a vertical plane, said one portion having its upper edge formed in a concave shape and sharpened as by being beveled and said hook being upturned.

* * * * *